(12) United States Patent
Harvey et al.

(10) Patent No.: US 11,270,301 B2
(45) Date of Patent: *Mar. 8, 2022

(54) SYSTEM AND METHOD FOR MANAGING MERCHANT-CONSUMER INTERACTIONS

(71) Applicant: ModoPayments, LLC, Richardson, TX (US)

(72) Inventors: Gregory W. Harvey, Marion, IA (US); Samuel N. Brown, Dallas, TX (US); David S. Sink, Dallas, TX (US); Aaron Wilkinson, Plano, TX (US); Michael Menefee, Richardson, TX (US); Mark S. Saum, Plano, TX (US); Colm Bergin, Dallas, TX (US); Bruce Parker, Richardson, TX (US); Ralf Erich Schulz, San Francisco, CA (US); Jon Buell, Dallas, TX (US); Jason Fisher, Plano, TX (US)

(73) Assignee: ModoPayments, LLC, Richardson, TX (US)

( * ) Notice: Subject to any disclaimer, the term of this patent is extended or adjusted under 35 U.S.C. 154(b) by 19 days.

This patent is subject to a terminal disclaimer.

(21) Appl. No.: 14/299,653

(22) Filed: Jun. 9, 2014

(65) Prior Publication Data

US 2014/0289126 A1 Sep. 25, 2014

Related U.S. Application Data

(63) Continuation of application No. 13/282,292, filed on Oct. 26, 2011, now Pat. No. 8,751,380.
(Continued)

(51) Int. Cl.
*G06Q 20/38* (2012.01)
*G06Q 30/02* (2012.01)
(Continued)

(52) U.S. Cl.
CPC .......... *G06Q 20/385* (2013.01); *G06Q 10/00* (2013.01); *G06Q 20/32* (2013.01); *G06Q 20/322* (2013.01);
(Continued)

(58) Field of Classification Search
CPC ............. G06Q 20/3821; G06Q 20/382; G06Q 20/401; G06Q 20/322; G06Q 20/363;
(Continued)

(56) References Cited

U.S. PATENT DOCUMENTS 6,754,636 B1 * 6/2004 Walker et al. .................. 705/50
8,751,380 B2 * 6/2014 Harvey .................. G06Q 30/00
705/39

(Continued)

FOREIGN PATENT DOCUMENTS

WO WO 2012/040377 A1 3/2012

OTHER PUBLICATIONS

European Communication dated Feb. 27, 2018 for Application No. 14851165.2, 8 pages.

*Primary Examiner* — Elda G Milef
(74) *Attorney, Agent, or Firm* — Frost Brown Todd LLC

(57) ABSTRACT

A system for combining a payment mechanism with an offer to a consumer is described. The system includes a virtual payment account number generation engine to generate virtual payment account numbers that can be used by a consumer in a payment transaction at a merchant, the virtual payment account number generation service also operable to take a portion of the virtual payment account number and send it as a checkout code to a consumer using the consumer's mobile device, and an offer generation engine used to set rules for an offer to be sent to consumers, create a fund for the offer, and determine individual consumer's eligibility for the offer. The offer is associated with the checkout code
(Continued)

such that the offer is processed as part of the payment during the payment transaction using the virtual payment account number.

17 Claims, 10 Drawing Sheets

Related U.S. Application Data

(60) Provisional application No. 61/406,657, filed on Oct. 26, 2010, provisional application No. 61/527,699, filed on Aug. 26, 2011.

(51) Int. Cl.
*G06Q 30/06* (2012.01)
*G06Q 30/00* (2012.01)
*G06Q 10/00* (2012.01)
*G06Q 20/32* (2012.01)
*G06Q 20/40* (2012.01)
*G06Q 40/00* (2012.01)

(52) U.S. Cl.
CPC ......... *G06Q 20/405* (2013.01); *G06Q 30/00* (2013.01); *G06Q 30/0222* (2013.01); *G06Q 30/0241* (2013.01); *G06Q 30/0601* (2013.01); *G06Q 40/00* (2013.01)

(58) Field of Classification Search
CPC ...... G06Q 20/385; G06Q 20/40; G06Q 20/20; G06Q 20/202; G06Q 20/206; G06Q 20/3674; G06Q 20/4016; G06Q 20/3224; G06Q 20/325; G06Q 20/327; G06Q 20/3278; G06Q 30/00; G06Q 30/0261; G06Q 30/0267; G06Q 30/06; G06Q 30/0641; G06Q 20/00; G06Q 20/32; G06Q 20/3227; G06Q 20/38; G06Q 20/4014; G06Q 30/0241; G06Q 30/0268; G06Q 10/00; G06Q 20/405; G06Q 30/0222; G06Q 30/0601; G06Q 40/00
See application file for complete search history.

(56) References Cited

U.S. PATENT DOCUMENTS

| | | | |
|---|---|---|---|
| 9,681,359 B2* | 6/2017 | Ramalingam | G06Q 20/325 |
| 9,767,474 B1* | 9/2017 | Ramalingam | G06Q 30/0601 |
| 2002/0082986 A1* | 6/2002 | Lu | 705/39 |
| 2002/0152123 A1* | 10/2002 | Giordano et al. | 705/14 |
| 2003/0023549 A1* | 1/2003 | Armes et al. | 705/40 |
| 2003/0216960 A1* | 11/2003 | Postrel | 705/14 |
| 2005/0149387 A1* | 7/2005 | O'Shea et al. | 705/14 |
| 2005/0240478 A1* | 10/2005 | Lubow et al. | 705/14 |
| 2005/0252961 A1* | 11/2005 | Rasti | 235/380 |
| 2006/0020542 A1 | 1/2006 | Litle et al. | |
| 2008/0065490 A1* | 3/2008 | Novick et al. | 705/14 |
| 2008/0133351 A1* | 6/2008 | White et al. | 705/14 |
| 2010/0125509 A1 | 5/2010 | Kranzley et al. | |
| 2010/0223145 A1* | 9/2010 | Dragt | G06Q 20/20 705/17 |
| 2011/0029362 A1 | 2/2011 | Roeding et al. | |
| 2011/0087550 A1* | 4/2011 | Fordyce et al. | 705/14.65 |
| 2011/0166992 A1* | 7/2011 | Dessert et al. | 705/39 |
| 2011/0238476 A1* | 9/2011 | Carr et al. | 705/14.25 |
| 2012/0010938 A1* | 1/2012 | Standley | G06Q 30/02 705/14.36 |
| 2012/0101887 A1 | 4/2012 | Harvey et al. | |
| 2012/0130797 A1* | 5/2012 | Shin | 705/14.38 |
| 2012/0235865 A1 | 9/2012 | Nath et al. | |

* cited by examiner

SYSTEM AND METHOD FOR MANAGING MERCHANT-CONSUMER INTERACTIONS

CROSS-REFERENCE TO RELATED APPLICATIONS

The present application claims priority to patent application Ser. No. 13/282,292, filed Oct. 26, 2011, titled "System and Method for Managing Merchant-Consumer Interactions", which claims priority to U.S. Provisional Patent Application No. 61/406,657, filed Oct. 26, 2010, titled "System and Method for Managing Merchant-Consumer Interactions"; and U.S. Provisional Patent Application No. 61/527,699, filed Aug. 26, 2011, titled "Secure Payment System", the entire contents of which are hereby incorporated by reference.

TECHNICAL FIELD OF THE INVENTION

The present invention relates to electronic payment processing and offer systems, and more specifically to a system and method for making and redeeming offers in conjunction with a secure, mobile, electronic payment processing system.

BACKGROUND OF THE INVENTION

Over the years, payment cards, including credit, debit, prepaid of both an association of bank issuers (e.g. VISA) and private or proprietary brand (e.g. Target), have become one of the most common forms of payment for payment transactions. Payment cards are used to purchase nearly 4 trillion dollars worth of goods and services annually. This represents roughly one-fourth of the total U.S. economy. Almost 90% of online consumer transactions in the United States were made using a payment card. Payment cards have eclipsed other traditional methods of payment (notably checks and cash), and now are moving quickly to a dominant share of payments volume. Payment cards have a magnetic stripe which has been affixed to a piece of plastic, and is used at the payments terminal to "swipe" the payment credentials into the payments terminal. This is the predominant method by which these payments are conducted. Despite this widespread use in the United States, there are still a large number of problems to overcome in regard to payment card security, identification of consumers usage of payment cards, and the management of the data associated with payments cards transactions.

More recently, the use of so-called chip cards (also known as smartcard or EMV enabled cards, and NFC enabled cards) has also become a popular topic of discussion, and have seen some initial uses. A chip card is similar to a standard payment card; however may contain an embedded microprocessor, data storage or radio frequency communications abilities, or all of the above to either replace or enhance the functionality of the magnetic stripe. In certain implementations, the chip uses electronic cash which transfers from the consumers' card to the sellers' device. A popular smartcard initiative is the VISA Smartcard. Using the VISA Smartcard you can transfer electronic cash to your card from your bank account, and you can then use your card at various retailers and on the internet. Another popular NFC card initiative is the PayPass system from MasterCard which allows an enabled card to simply be "dipped" near the payments terminal to initiate the exchange of payments credentials.

In addition to traditional payment cards and chip cards there are companies that enable financial transactions by acting as an intermediary where no physical card is present, such as PayPal. These intermediaries perform payments processing generally referred to as "card not present" processing. Many of the these intermediaries permit consumers to establish an account quickly, and some permit consumers to transfer funds into their on-line accounts from a traditional bank account (typically via ACH transactions), and vice versa, and to use the money held by the intermediary to pay merchants for goods and services.

Referring now to FIG. 1(a), the current state of the art for payment processing using payment cards or chip cards is shown. After a buyer 11 decides to initiate a transaction 10 to buy goods and/or services from a merchant 12, the merchant 12 will transfer these goods and services 13 to the buyer 11 and the buyer 11 will transfer payment in the form of payment credential information 14 (such as a magnetic card swipe, or chip card dip, or a more manual conveyance of the payment card account information) or cash back to the merchant 12.

In a cash transaction, cash moves from the buyer 11 to the merchant 12 via face to face exchanges. In the non-cash transaction, the buyer 11 will transfer the payment information 14 to the merchant 12, adjusting the appropriate accounts of the seller and buyer. The merchant 12 generally uses a different bank or acquirer 15 from the buyer's bank or issuer 11, and in all cases, does not have direct access to the buyer's bank, so a payment card network 17 operates between the merchant bank 15 and the buyer bank 16 in order to move funds between the appropriate accounts. The payment card network can be an association open to all bank issuers and acquirers (e.g. VISA, MasterCard), an association available only to certain banks (e.g. Discover, American Express), or a proprietary network available only to certain merchants (e.g. Target, Starbucks).

Referring now to FIG. 1(b), a similar transaction using an intermediary, such a PayPal, is shown. The development of the Internet has ushered in new processes for payments, for example, the buyer 11 and merchant 12 have the ability to conduct a payment transaction 20 using the intermediary instead of presenting a physical payment card transaction process shown in FIG. 1. In this type of system, the buyer account information 22 is transferred along with the order. In the intermediary transaction the intermediary 21 holds funds received from buyer's bank 16. Upon receipt of instructions from the buyer 11 and merchant 12, the intermediary 21, transfers funds from the buyer's account to an account held by the merchant at the intermediary, potentially using the payment card network 17. From there the merchant 12 can have the funds transferred to the merchant's bank 15.

Each of the payment methods above can classified as prepaid, pay-now or pay-later systems based on the nature of the funding of the transaction. In pre-paid systems, such as those operated as stored value cards, the buyer/consumer pays before the transaction, i.e. the consumer funds the account with some form of payment and uses the prepaid account to pay for her transactions. Pay-now systems mean that the consumer's account is checked and debited at the same time when the transaction takes place, e.g. the process that occurs when debit cards linked to a bank account are used for payment. In pay-later (credit-based) systems the consumer pays after the transaction, e.g. a consumer using a credit card for a purchase, and then paying the credit card at a later date (typically 30 days later) from funds in a bank account.

Separate and apart from payment processing systems and methods, both merchants and buyers also interact through loyalty, award, coupon and/or offer programs. Loyalty and award programs are used by merchants to reward repeat consumers and to incentivize consumers to frequent the merchant. The merchant may award points that can be redeemed for goods or services or may provide members of the programs special discounts not available to non-members. The programs also allow the merchant to track the purchasing habits of the program members and to engage in targeted marketing based on those buying habits.

Offer programs, such as group discount programs, can be a type of marketing or advertising for merchants allowing them to reach consumers that might not otherwise visit the merchant. The most notable example of group offer programs is Groupon. Groupon works as an assurance contract using its web platform. Generally, if a certain number of people sign up for an offer made by a merchant through Groupon, then the offer, or deal, becomes available to all. If the predetermined minimum is not met, no one gets the offer. This reduces risk for merchants, who can treat the offers/coupons as quantity discounts, as well as sales promotion tools. Groupon makes money by keeping approximately half the money the consumer pays for the coupon. So, for example, an $80 massage could be purchased by the consumer for $40 and then Groupon and the merchant would split the $40.

That is, the merchant provides a massage valued at $80 and gets approximately $20 from Groupon for it. And the consumer gets the massage, in this example, from the retailer for which they have paid $40 to Groupon. Unlike classified advertising, the merchant does not pay any upfront cost to participate, Groupon collects personal information from willing consumers and then contacts only those consumers, primarily by a daily email, who may possibly be interested in a particular product or service.

Among the problems with the current electronic payment processing systems is security. Should a consumer's credit card number, smartcard information, intermediary id, etc. become known to a thief, that person can use the information to make fraudulent charges. The account and card numbers as well as intermediary ids are relatively fixed, i.e. are not changed often, and persist for a long time. Additionally, those numbers or ids can give access to funds in excess of those required for a particular transaction. Nor do current payment methods provide links to the actual purchases made by a consumer in merchant locations. Finally what is needed is a method for merchant programs or other offer provider to enable a merchant to process those offers through the merchant's existing electronic payments processing systems, with additional security, and the ability to identify the consumer who participates, individually.

What is needed is a secure payment processing system that is integrated with a merchant's award programs and/or offers, and uses a reliable mechanism to identify consumers.

BRIEF SUMMARY OF THE INVENTION

The concepts described herein relate to a system and service that simplifies the processes whereby consumers interact electronically with merchants, to pay for purchases, and/or to receive relevant offers, receive rebates or refunds and track receipts. The service also increases the relevance of merchant-consumer interactions, allowing the merchant to target offers to the consumer as the consumer is shopping. In preferred embodiments, the system and service described herein uses virtual personal account numbers (VPANs) representing stored value payment cards to process transactions. The system and service provide for a portion of the VPAN, referred to as the checkout code, to be sent to the consumer after initiating a visit at a merchant, and another portion of the account number to the merchant referred to as the merchant code. In a preferred embodiment, the merchant code forms the prefix while the checkout code form the suffix of the account number.

In a preferred embodiment a method for allowing a consumer to complete a payment transaction with a merchant is described. The method includes sending a checkout code to the consumer when the consumer initiates a visit to the merchant, the checkout code forming a portion of a virtual payment account number, and combining the checkout code with a merchant code, the merchant code provided to the merchant prior to the payment transaction, wherein the combined checkout code and merchant code form the virtual payment account number. The method further includes processing the payment transaction using the virtual payment account number as the mechanism for payment using the merchant's existing payment processing system.

In another embodiment a virtual payment account number used to complete a payment transaction with a merchant is described. The virtual payment account number includes a checkout code provided to a consumer and associated with a particular visit to a particular merchant and a merchant code provided to a merchant. The checkout code and the merchant code are combined to create the virtual payment account number, the virtual payment account number being prefunded with sufficient funds to cover the payment transaction between the consumer and merchant using the merchant's existing payment processing system.

In yet another embodiment a method for incorporating an offer with a payment method is described. The method includes generating an offer by an offer provider, the offer associated with an offer account having funds to cover the offer and splitting a virtual payment account number which can be used to make a payment into a checkout code and a merchant code. The method then describes associating an offer with a checkout code, sending the checkout code to a consumer, and applying the offer value to the payment transaction by using the virtual payment account number to make the transaction payment and to withdraw funds from the offer account to cover the offer.

In another embodiment, a system for combining a payment mechanism with an offer to a consumer is described. The system includes a virtual payment account number generation engine to generate virtual payment account numbers that can be used by a consumer in a payment transaction at a merchant, the virtual payment account number generation service also operable to take a portion of the virtual payment account number and send it as a checkout code to a consumer using the consumer's mobile device, and an offer generation engine used to set rules for an offer to be sent to consumers, create a fund for the offer, and determine individual consumer's eligibility for the offer. The offer is associated with the checkout code such that the offer is processed as part of the payment during the payment transaction using the virtual payment account number.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

In certain embodiments, the concepts described herein relate to a system and service that simplifies the processes whereby consumers interact electronically with merchants, to pay for purchases, and/or to receive and redeem relevant offers, receive and redeem rebates or refunds and track receipts. The service also increases the relevance of merchant-consumer interactions, allowing the merchant to target offers to the consumer as the consumer is shopping as well as associate historical purchase transaction data with a particular consumer.

In preferred embodiments, the system and service described herein uses virtual personal account numbers (VPANs) representing stored value payment cards to process transactions. The system and service provides a portion of the VPAN to the consumer (the coin/consumer token/checkout token/checkout code), and another portion of the account number to the merchant (the lane token/merchant code). In a preferred embodiment, the merchant code forms the prefix while the checkout code forms the suffix of the account number.

Figure 1A:
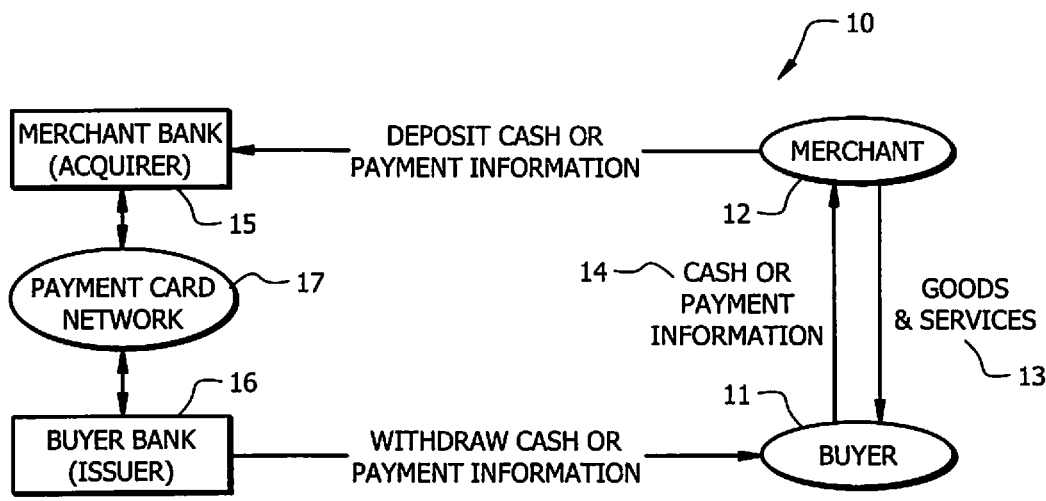
FIG. 1(a) is a diagram of prior art electronic payment systems for electronic payments such as credit cards.
Figure 1B:
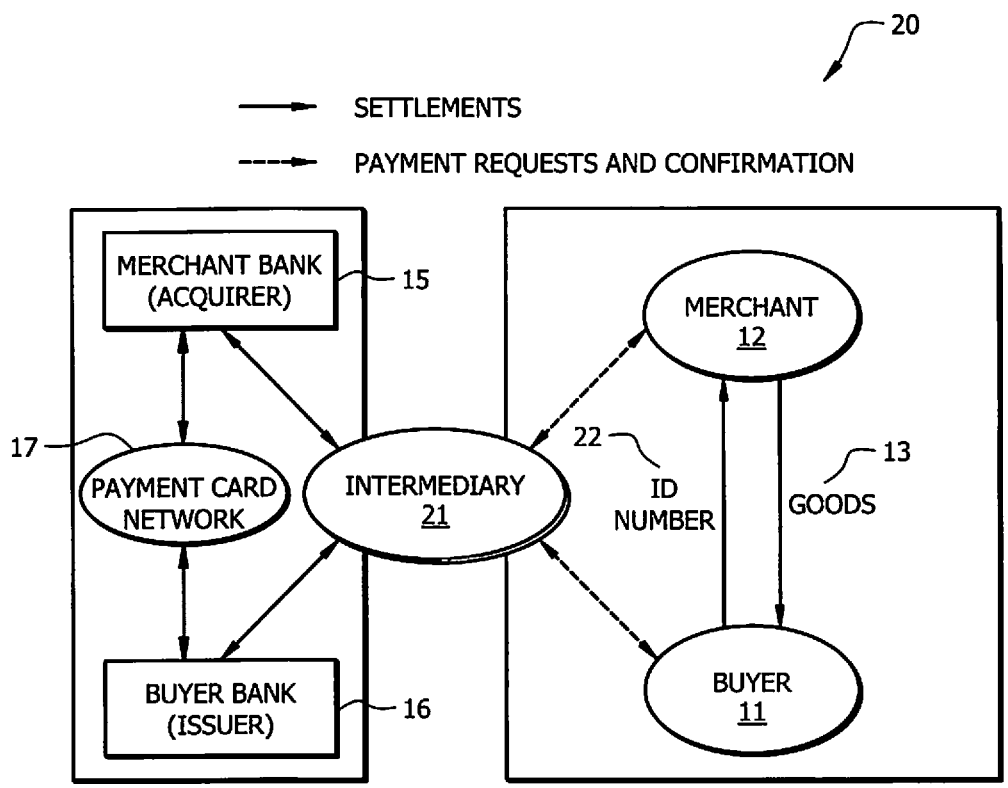
FIG. 1(b) is a diagram of prior art electronic payment systems using an intermediary.
Figure 2A:
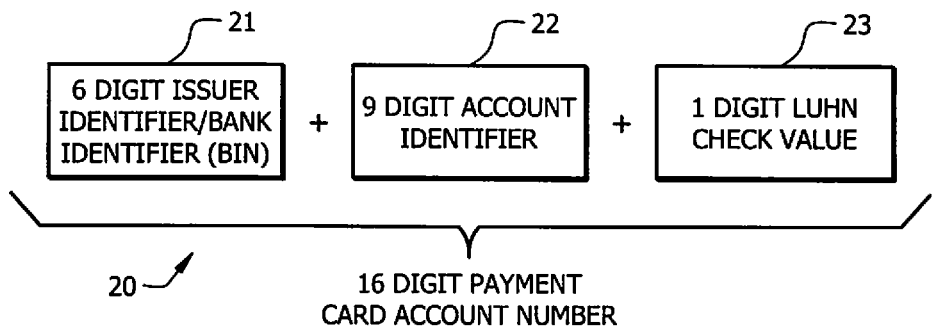
FIG. 2(a) is a diagram showing a traditional credit card account number.
Figure 2B:
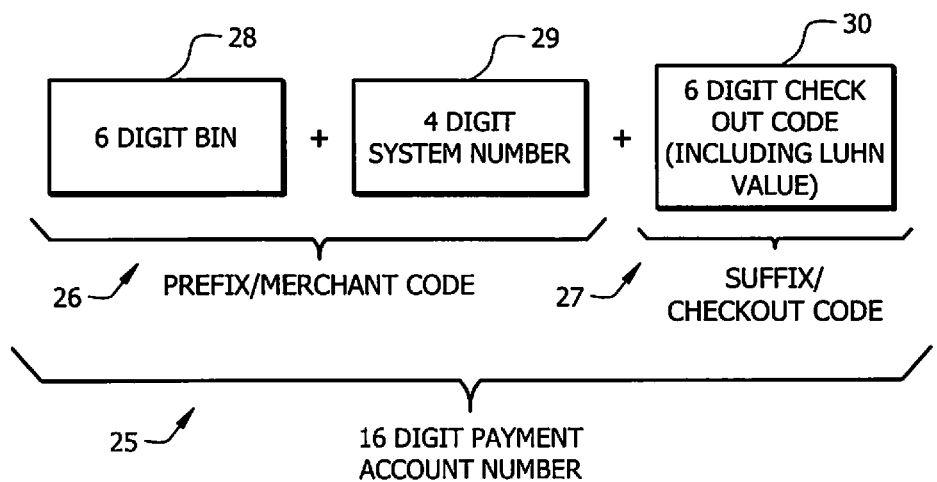
FIG. 2(b) is a diagram showing an embodiment of a virtual personal account number in accordance with the concepts described herein.
Figure 2C:
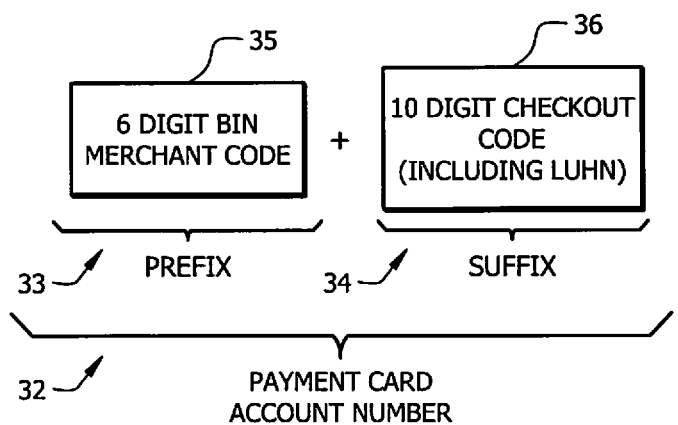
FIG. 2(c) is a diagram showing an alternate embodiment of a virtual personal account number in accordance with the concepts described herein.

Referring now to FIGS. 2(a) through (c), embodiments of the construction of a VPAN usable with the present system and service is described in greater detail. FIG. 2(a) shows a typical payment card account number used by the Visa/Mastercard processing systems. In a preferred embodiment, an account number 20 is 16 digits long and is formed by a leading six digit issuer identifier (BIN) 21 that identifies the bank or financial institution that issued the card. While a 16 digit number is shown, any number of digits can be used to create a VPAN according to the concepts described herein. The BIN 21 is followed by a nine digit account number 22 for the particular consumer/card and a one digit LUHN check value 23 that allows the processor to verify that the account number is valid.

FIG. 2(b) shows one embodiment of a VPAN according to the concepts described herein. The WAN in this embodiment is a sixteen digit account number 25 processable by existing payment card payment processing systems found at most merchants. The WAN is formed from two parts. The first portion, or prefix 26, is the merchant code and can be 10 digits formed from the six digit BIN 28 and a four digit system number 29 assigned by the present system. The second portion, or suffix 27, is the checkout code and is formed by a five digit number plus a LUHN check value 30. As will be discussed with respect to FIG. 3, the prefix and suffix are combined at the time of a transaction to form a payment card account number usable by the merchant to process the transaction.

FIG. 2(c) shows an alternate embodiment of a VPAN according to the concepts described herein. VPAN 32 is formed by a six digit prefix 33 consisting of the BIN 35 and a 10 suffix 34 that is the consumer token also referred to as the checkout code and LUHN value 36. While FIGS. 2(b) and 2(c) show two embodiments of a WAN, one skilled in the art will understand that there are any number of ways to form a WAN where a portion of the WAN is given to the merchant and the remainder of the VPAN is given to the consumer, where the WAN is formed by combining the merchant portion with the consumer portion in some manner. Further, the WAN may represent a stored value account that is particular to this merchant or is in some other fashion unique. Other divisions of the prefix and suffix may also be used in order to optimize processing to specific card ranges including dividing payment card account numbers into more than two constituent parts. This includes handling different card number sizes such as for 13-digit VISA cards, 15-digit American Express Cards and Diner's Club Cards, and any size of other commonly used or proprietary card numbers.

Figure 3:
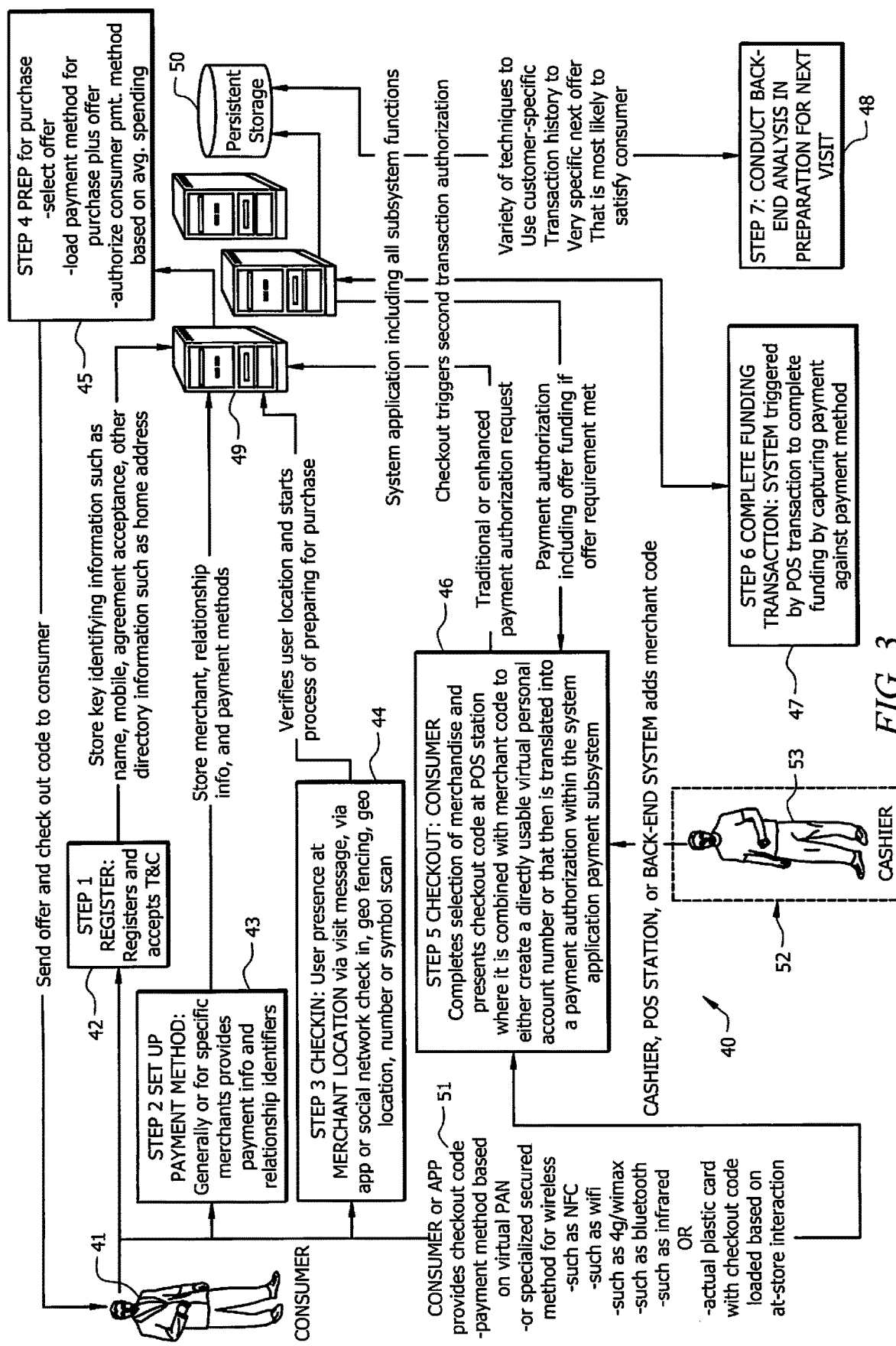
FIG. 3 is a network and flow diagram showing an embodiment of a method for processing a transaction according to the concepts described herein and the interaction between various elements of the transaction.

Referring now to FIG. 3, a preferred embodiment of a system and method for processing payments using payment card accounts is shown. The method 40 preferably begins by registering new consumer(s) 41 before the consumer(s) can enter into transactions using the system, as shown by step 42. The new consumer 41 creates an account and supplies information such as name, address, phone and other identifying information. In addition, at the time of sign up, the consumer 41 can agree to terms and conditions for use of the system and service and register a payment card as shown in step 43 used to fund the consumer portion of transactions. The payment card may be validated by the system and may be checked for availability of funds.

Next, the system 49, which is connected to persistent storage 50, requires prior to use that merchants 52 who desire to use the system also register. The merchant provides their physical address, trade name, and business name, as well as a phone number and other merchant-specific information. The information provided by the merchant can also be verified through other sources such as a Google search as well as a physical GPS location provided by an independent source. The verification methods would help prevent fraudulent merchant accounts.

The merchant then can create an offer account by which the merchant can fund offers that the system herein presents to consumers and that are fulfilled at their stores resulting in the specific location receiving funds from both the consumer and from the offer account. The offer account contains the merchant's funds, that are accessible by the service to fulfill transactions. The offer methodology and process will be described in greater detail with respect to FIGS. 8 through 10. In addition to banks or other funding sources or intermediary services such as PayPal can be used for merchant accounts. The merchant 52 then provides information used by the system to create and load funds onto VPANs. In preferred embodiments, the system knows the average sale amount, the number of transactions per week/month, the frequency of visits, and the gross margin of a typical visit in order to best serve the merchant. The system then sends the merchant 52 the payment prefix(es), or merchant codes(s), which are based on the range of the VPANs used for this merchant for transactions at that merchant and which must be combined with the payment suffix(es), or checkout codes in order to create a complete VPAN that then is presented on the behalf of the consumer for payment authorization.

After both the consumer and merchant have registered with the system, the system may then be used to allow the consumer 41 to pay for goods or services or may also be used to present offers to the consumer which may be redeemed through a transaction using the system. As shown in step 44, the consumer checks in or is detected in a participating merchant location. This can be accomplished by any known or future mechanism, such as by having the consumer send a text or SMS message to the system, having the user activate an app on a smart phone that reads a bar code or Quick Response (QR) code at the merchant location, using a geo location or geo fencing feature or a phone or other mobile device that detects the consumer's location, social networking, or any other mechanism to alert, detect and/or verify the consumer's location.

This location can be set in any number of ways. The service, while not limited thereto, includes embodiments of three ways. The checkout code can be requested for a merchant by the subscriber, for an imminent visit. Alternatively, a checkout code may be automatically sent to a subscriber device once the device is "detected" entering a location. Finally, a hybrid of these two approaches is possible, where a subscriber has already entered an establishment and desires repeat business. The person can then request an additional checkout code for a device where context or location awareness is already established. To accommodate transaction inquiries or to facilitate returns/exchanges, the checkout code and mobile phone number may be submitted in the context of the location to retrieve the transaction details.

Once the consumer's 41 presence at the merchant 52 has been determined and where possible verified via geo location services or other means such as cell tower triangulation or GPS location transmission by the system 49, the system then prepares for a potential purchase by the consumer 41, as shown in step 45. The system can, preferably, take a number of actions. The system selects a consumer checkout code to send to the consumer 51 to be used should the consumer 41 make a purchase at the merchant 52. As described, the checkout code, when combined with the merchant code, forms a complete VPAN that can be used to electronically pay for a purchase. As described, in preferred embodiments of the system, the VPAN corresponds to a stored value card number that has been loaded with an amount deemed sufficient to complete a transaction at the merchant. The amount can be a multiple of the average value of a transaction at that merchant, can be set based on the consumer's purchasing history, can be selected by the consumer or merchant or can be set using any other manner consistent with the concepts described herein. Additionally, the value can be transferred to the stored value card at the time of the consumer's check in at the merchant, can be preloaded at some predetermined time, or can be loaded to the card according to some other methodology. If the card is preloaded, the checkout code can be selected based on the amount loaded in that stored value card account. In addition, the consumer's payment account can be authorized for some amount the system determines for the specific location.

Also in step 45, the system 49 can determine if there is an offer available for the consumer at that merchant. The offer can come from the merchant, or a related vendor, manufacturer, franchisor, another consumer (gift(s)), etc. any or all of whom are considered offer providers. If an offer or offers are available for the consumer, one or more are selected and presented to the consumer with the checkout code. The offer may have conditions or require that certain triggers be met for the consumer to take advantage of the offer. For example, the consumer may be required to spend a minimum amount or to purchase particular goods or services to receive the benefit of the offer. Any conditions or triggers may be included in the offer while remaining within the scope of the concepts described herein. The system can be used to track whether the conditions or triggers are met using the checkout code, or the merchant modify the point of sale system in order to verify, via automated or manual means, the triggers at the time the transaction is completed at check out. In addition, the offer provider's payment account may be authorized for the specific amount of the offer that the consumer is qualified to receive.

At check out, as shown in step 46, the consumer provides the merchant with the checkout code that was sent to them during check-in which may be a 6 digit suffix/checkout code as described in FIG. 2(*b*). As described, the assigned suffix/checkout code may have the implication of setting a value limit for the transaction since the stored value card account associated with the checkout code may be pre-loaded with a value before check out. The checkout codes are preferably set for a reasonable upper limit of what the consumer is likely to spend at this merchant. The system may include a function for the consumer to request more value (e.g. increase the amount they can spend on this VISIT), or to request that the system lower their value (perhaps for budget management reasons).

The merchant's cashier 53 enters the prefix/merchant code provided to the merchant by the system, plus the consumer's six digit suffix/checkout code. Expiration date, and any other information required for processing, may be provided to the merchant with the merchant code. The transaction is routed to the preloaded stored value card that was prepared previously, such as at check-in or at the beginning of the business day, and authorized by existing payment processing systems. Settlement will similarly be managed by existing payment processing systems in a known fashion.

In preferred embodiments, a process for combining the merchant code and checkout code includes, in response to a request by the cashier for payment, providing the checkout token to the cashier verbally, in writing, by use of a code on a smart phone app, through wireless communications between a smart phone and or by any other means. The cashier then combines the consumer checkout code with the merchant code and enters it as a "card number" in the register or on the card "swipe" terminal or via other means. The actual entry of the number can be manual or can be through plug in application at the card terminal or merchant register. This results in the register/terminal processing as if a physical card had been presented (though without the card-swipe), or through the actual swipe of a card that has been programmed with the VPAN.

The system 49 receives a notification (advice) that an authorization (which includes capture/completion) has been released for a given card number, and amount. The system 49 will then send a receipt to the consumer for that amount. The system of the present invention, or the merchant, can then compare the amount of the transaction to any applicable offers that were associated with this checkout code. If an offer associated with the checkout code was activated and the conditions for the offer are fulfilled, then the amount of the offer is preferably requested from the merchant's offer account or alternatively another funding account for which the offer provider is responsible. Additionally, the amount of the offer funds requested from the merchant's account (or other funding account) may be grossed up by an amount representing a fee for use of the system.

The system then performs a capture transaction for the total amount minus the offer amount and deducts that amount from the stored value card account based on the authorization performed earlier, as shown in step 47. After the value has been deducted from the stored value card account using the VPAN formed by the checkout code and the merchant code, the consumer's payment card account, loyalty account, reward account, or any other funding source is charged for the total sale minus the offer, which is charged against the offer provider's account.

After the transaction and funding are complete, method 40 moves to step 48 where post transaction analysis is conducted. The system will allow the merchant 52 to manage their offers account based on the amount of funding they provide for offers and the responses that they get. Merchants can use information collected about the purchase and the response to offers to create offers based on the responsiveness of consumers to prior offers. When the merchant decides to make additional offers, the merchant simply adds the value corresponding to the offer to the merchant funding account. Similarly, other offer providers may access transaction analysis data in order to provide additional offer funding.

The payment process using the VPAN according to the present method follows a typical payment card scenario with respect to the stored value card account that was selected for this transaction, except for potential variations attributable to the use of the system. For example, any customer service interaction from a chargeback exception dispute or fraud perspective initiates with the present system instead of either the issuer of the WAN (if different than the present system), or with the consumer's payment card issuer. Also, the system, in addition to or instead of the merchant, will create a proof of authorization that is retained as evidence of the transaction including location, mobile device, payment transaction details, and purchase receipt data.

In preferred embodiments of the system described herein, checkout code is intended to be a single use account number active only for the merchant visit to which it is associated. The checkout code provides credentials for access to the system for a payments authorization, and serves as a longer term reference number for a transaction by a consumer, specific to a particular location. A checkout code may be used to lookup a transaction after it has been completed, given the checkout code and some other details such as the timeframe in which the transaction occurred, the location, or the registered mobile phone number associated with the transaction.

In addition to the checkout code being specific for a given consumer at a given location, the checkout code can also be programmed to be active only for a certain period of time while the consumer is in the merchant location. Generally, this will be on the order of the third or fourth deviation from the average visit length to the merchant, but can be set to any value desired by the system, merchant and/or offer provider. For example, if a coffee shop has a mean visit time of 15 min, but a standard deviation of 3 minutes, the checkout code should be active for at least 25 min.

Once a checkout code is has been activated, or used, it may not be re-used for a substantial period of time. Generally, the period of time between re-use of a particular checkout code should be on the order of a time frame measured in years, with a time frame of at least seven years being preferable. With respect to the actual number generated as the checkout code, the generation of the checkout code itself should not be "anticipatable", and therefore should not be susceptible to fraudulent use via guessing or other means of providing an otherwise valid VPAN at the specific merchant location.

For the service to permit subscribers to complete transactions using the system described herein, individual transactions should preferably be uniquely identified. Once consumers register with the service and record payment method information within the secure environment of the service platform, they will be able to complete a transaction with a traditional retailer according to a unique identifier represented by the checkout code, the merchant code and transaction date and time.

As described, a preferred mechanism to secure these transactions would be a confirmation number. In combination with the merchant code and possibly the date and time of the transaction, the checkout code would uniquely identify a visit by a consumer to a merchant at a specific date and time. Once the transaction is completed and processed, a subscriber will also be able to recall past transaction details via their mobile device or internet connection using an app or web browser.

Several data security enhancements may be used to ensure valid use and re-use of the checkout code, once it is generated. For example, the checkout code will have a time-to-live, or valid time frame in which to use it. Alternatively, the checkout code will not be stored on the service platform in its native form, to prevent unauthorized use and to enhance physical security of the database. Yet another alternative prevents a checkout code from being re-used for the same merchant, using any other device, for a given time period.

Figure 4:
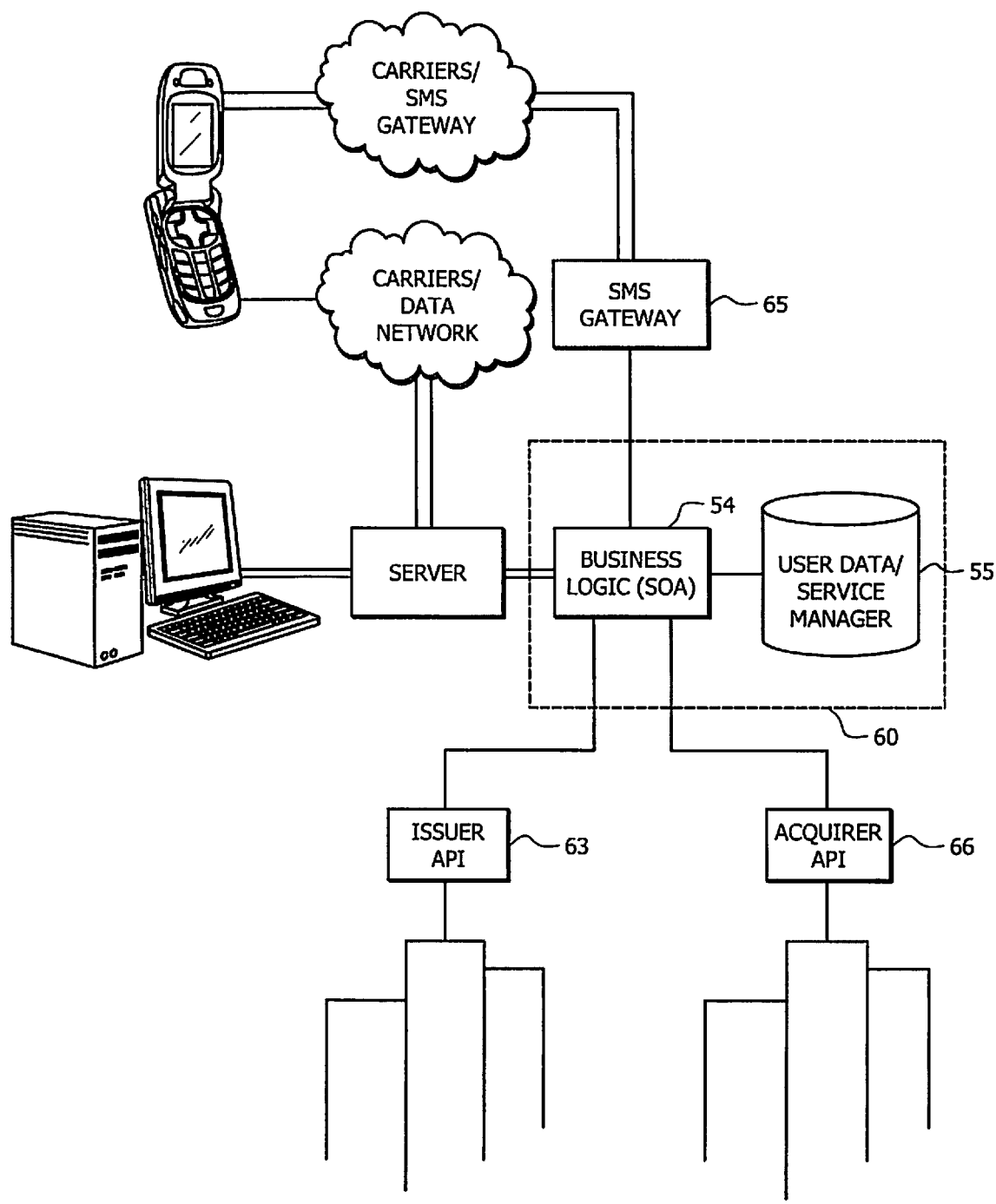
FIG. 4 is a network diagram showing the relationship between various elements of an embodiment of a system according to the concepts described herein.
Figure 5:
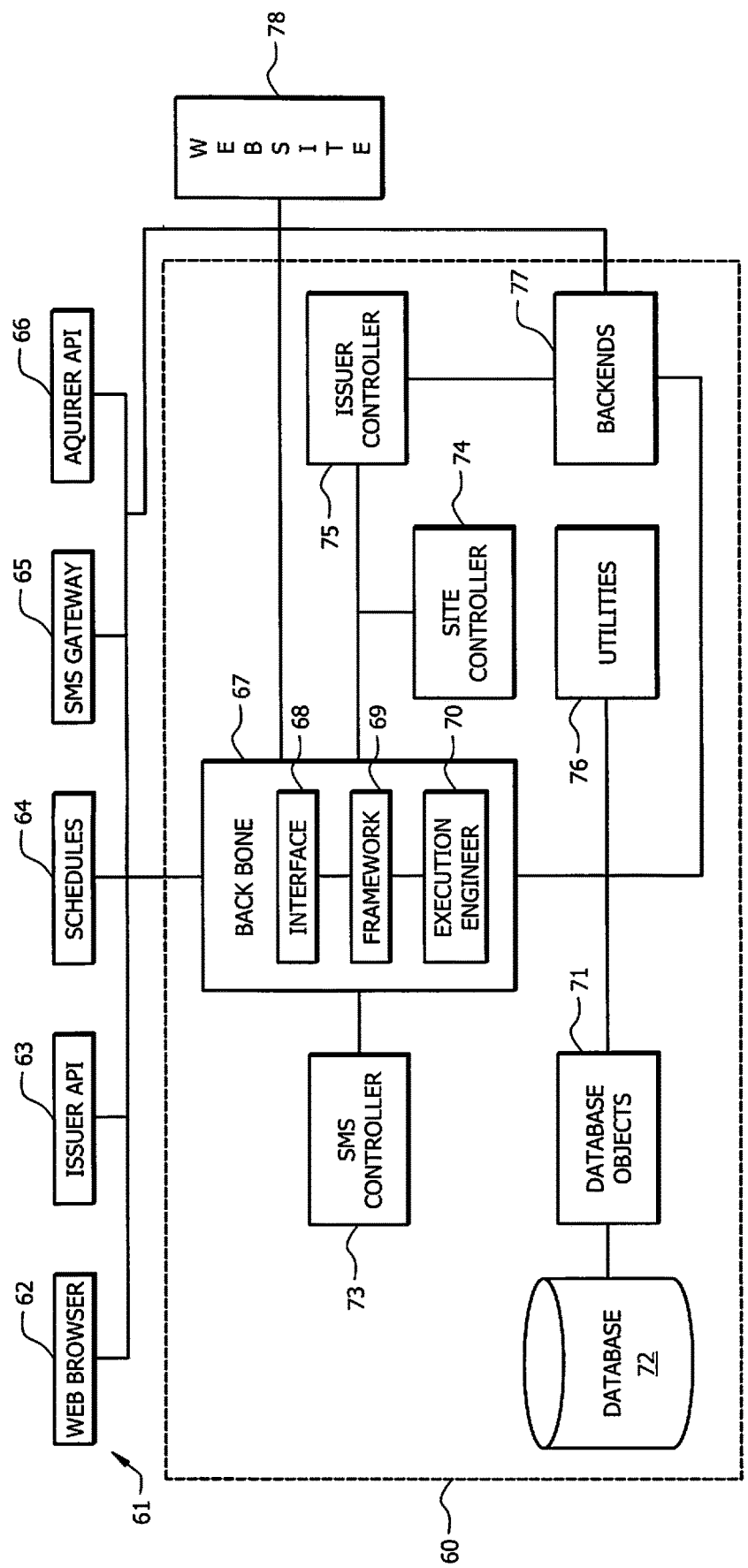
FIG. 5 is a block diagram of an embodiment of a system implementing the service and method described herein.

Referring now to FIGS. 4 and 5, an embodiment of a system for implementing a system and method according to the concepts described herein is shown. System, or generation engine, 60, communicates with external components 61. External components include web browser 62, issuer API 63, scheduler 64, SMS gateway 65, and acquirer API 66. Other external components may be included as required for system 60 to perform as described herein. Web browser 62 provides the interface for consumers, merchants and others to interact with system 60. Web browser 62 allows consumers and merchants to register and see account data, such as transaction history and personal data. Merchants, as well as other offer providers, can also use web browser 62 to create, edit, and manage offers.

Issuer API 63 is the interface to the VPAN issuers computer systems. Issuer API 63 is used to manage, fund and defund the stored value card accounts associated with the VPANs used by system 60. Scheduler 64 manages the timing of the interactions between the various actions of system 60. SMS gateway 65 provides the interface between system 60 and SMS communications and/or mobile applications used by consumers and merchants. Acquirer API 66 provides the interface between system 60 and the entity managing consumer and merchant accounts. Acquirer API 66 is used to claim funds from the merchant's offer or account and to charge the consumer payment method.

External components 61 communicate with system 60 over the backbone 67. Backbone 67 includes interface 68 that manages communications to and from external components 61. Framework 69 and execution engine 70 provide the platform to run the various applications that comprise system 60. Backbone 67 communicates with database object 71 which provides the interface between database 72 and the rest of system 60. Database 72 stores all of the information related to the operation of system 60 including consumer and merchant profiles, transaction histories, VPAN history and status and all accounting data.

SMS Controller 73, site controller 74, and issuer controller 75 provide the objects in system 60 that interact with their corresponding external components. SMS controller 73 provides the interface in system 60 with mobile communications, such as SMS text messages and the like, from consumers and merchants. Site controller 74 provides an interface using the web browser 62 to allow merchants to view, edit, and control offers and their merchant account at the acquirer. Issuer controller 75 manages the interaction of system 60 with the issuer of the VPAN accounts through issuer API 63, allowing system 60 to control which VPANs are active and the funding state of each VPAN in the system.

Utilities 76 provide utilities, applications, and objects that are used by the rest of system 60 in its operation. Backends 77 includes methods and objects that allow system 60 to provide instructions to the acquirer and issuer during transactions and account management. Website 78 is the public website for system 60 and is the portal through which consumers, merchants and third parties interact with the system over the internet using web browser 62.

As examples of the operation of system 60, various interactions between external components 61 and the elements of system 60 during typical operations will be described. As a first example, during a consumer registration process, a consumer will view the website 78 using web browser 62 with the interactions between web browser 62 and website 78 being controlled by backbone 67, including interface 68 of backbone 67 which can be implemented using a program like the open source Apache web server program. Backbone 67 communicates with database objects 71, which makes sure the appropriate changes are made to database 72 to reflect the new consumer registration and preferences. Database object 71 may also call utilities 76 as required to perform necessary operations.

In a second example, a merchant is added to the system over the web interface and the merchant is creating offers. Merchant uses web browser 62 to interact with the system 60 over backbone 67. Site controller 74 instructs database objects 70 to update the database 72 while backends 77 issues instructions to create and fund the merchant account at acquirer over acquirer API 66 that will be used to fund the merchant's offers. In another example, a consumer checkout is occurring. Scheduler 64 requests that backbone 67 check the VPAN account to see if the funds have been withdrawn as part of the checkout process using issuer API 63. Backbone 67 then uses the issuer controller to update database 72 using database objects 72. Backends 77 is then instructed to charge the consumer payment method and the merchant account as required for the funds spent by the consumer during checkout.

In an alternate embodiment to that described with respect to FIGS. 3, 4, and 5, the system and method include a device to detect the entry of a registered user at a retail location. As before, once the consumer is known to be at a particular merchant, the system notifies the consumer of the most current, relevant offers from the merchant. Using his mobile phone and the secure authentication features of the service, the consumer can apply available gift card balances toward his purchases and ensure that applicable loyalty program balances are updated, all without the need to use gift cards, store cards or other tokens.

When a registered consumer enters a participating retail location, the service can be set up to detect the consumer's mobile phone (if it is present and powered on), identifies the consumer and sends a welcome message to the consumer's phone, using, for example, an SMS message, a push notification, if enabled by the consumer, or other similar mechanism. The welcome message informs the consumer of any relevant offers or of any account credit balances applicable to the location (e.g. merchant store card balances, loyalty program points). The message can also provide the consumer a checkout code that may be used for a limited time to authenticate the consumer to the service. In preferred embodiments, the checkout code can be a 6-digit number generated by the service, though other numbers, strings, identifiers, symbols, or any other suitable identifier can be used as a checkout code in the same manner as described herein.

At the checkout, the consumer may authenticate himself to the service by entering his phone number and the 6 digit token at the POS terminal. Upon authentication, the consumer may use the POS terminal to apply available loyalty points toward the purchase, and/or to pay for the purchase using an available store card balance, or other payment type registered with the service. When the payment is authorized and confirmed, the device securely stores a record of the transaction receipt. The consumer can use the POS terminal to request a copy of the receipt, which the service transmits securely to the consumer's mobile phone or email account or which can be accessed via a web browser or app. At the checkout, a registered consumer may authenticate himself to the service using standard point-of-sale (POS) terminal hardware.

An alternative embodiment of the service registers with the merchant acquirer software that drives the POS terminal, when the device initializes. As a result, the terminal driving software can present an option to the consumer at the terminal to use the present system to pay. On selecting this option, the consumer is prompted to enter his phone number and the 6-digit checkout code provided on entering the premises.

An alternative embodiment resulting in a 16-digit string resulting from the concatentation of phone number and checkout code may be made compatible in format with the existing payments infrastructure, and may be routed by the terminal driving software to the Service in order to authenticate the user. If the system successfully authenticates the phone number/checkout code combination, the consumer details together with the rest of the transaction details may be used to check whether the consumer has any applicable loyalty accounts, what other payment methods are available, or whether any offers or discounts are applicable to the transaction. As a result, the consumer may be prompted to select whether he wishes to apply available loyalty points toward the purchase, and/or to pay for the purchase using an available store card balance, and will be notified if any discounts have been applied.

If there is not sufficient loyalty account credit or store card credit to fund the purchase, the service may prompt the consumer to select one of the payment accounts he has registered with the service. In this case, the Service will supply the payment account details to the merchant acquirer software, which will then process the payment in the normal way. When the payment is authorized and confirmed, the service obtains an electronic copy of the receipt. This may be accomplished by communication with the terminal driving software or intercepting the receipt details being sent to the terminal printer.

The service securely stores a record of the transaction receipt for future reference by the consumer or the merchant. The consumer may also request a copy of the receipt at the point of sale. In this case, the service securely transmits a copy of the receipt to the consumer's mobile phone in a format suitable for viewing on the specific device the consumer is carrying.

Currently there are many parties involved in even the simplest retail transaction. They may include but are not limited to: the consumer, the merchant, the payment acquirer, banks, various loyalty program providers, gift card program providers, other consumers via other offer mechanisms, manufacturers, state comptrollers (sales tax), warrantee program providers, rebate program providers, support information, service providers, etc. To add further complexity, any of these parties may change or stay the same depending on what specifically is being purchased. Each of these parties produce and consume information and services in their own domain and in relation to their own domain with little to no regard to how it may or may not be valuable to a party in a different domain.

Embodiments of the system described herein track, maintain, relate, and provide access to consumer specific retail data and retail services in a consolidated, centralized fashion and present it to the various interested parties in a way that they understand with a mind toward security, privacy, and value. Information and services may include but not be limited to: messages, reminders, entertainment, targeted advertisement, event notices, sale notices, receipt data, gift account access, loyalty data, payment, individualized offers, warrantee access, rebate process, etc.

This system can integrate within the existing retail infrastructure, complying to various established interfaces and protocols in order to collect the information from and provide services to the various domains. It can provide web-services or services similar to web-services to present and provide the information and services that is pertinent to each of the given parties.

As shown in FIGS. 4 and 5, this system will provide an abstraction layer of business logic 54 that will stand between system access and the various parties interested in system access. For instance a consumer may wish to look at their recent purchase receipt. This information might be access via several methodologies. A few being: a text message interface, a web-site, a mobile web-site, or a mobile "app". Each of these interfaces would access the business logic 54 in the same way via a service adapter. Business logic 54 is connected to user data/service manager 55.

Currently retailers have many avenues of consumer interaction. These avenues include but are not limited to coupons, discount prices, sales events, advertisements, loyalty rewards, gift cards, point of sale interaction, signage, merchandise return, etc. There are various delivery mechanisms for this interaction but they generally fall into 2 categories. Virtual interactions are those depending upon an abstract medium such as mail, signs, the internet, etc. Direct interactions are those involving retail staff.

Direct interactions are generally more efficient because they involve personal service in response to a real-world event. A dialog at the return desk happens because a consumer walks up to it with a previously purchased item. Sales personnel offer help because a consumer enters their aisle. The merchant's customer support staff give aid because a consumer calls a service desk phone number. The weakness of direct interaction is that it relies on sales staff who are costly, time limited, and who cannot generally retain pertinent details about consumers from visit to visit.

Virtual interactions on the other hand are generally cheap (on a per-interaction basis), but also inefficient, relying on mass mailings, signs, advertisements, etc. to generate a response in a very small fraction of consumers on the receiving end. This is because virtual interaction is blindly active. That is, it is initiated solely by the retailer caused by no real-world event and usually very impersonal. As such, consumers risk virtual interaction fatigue resulting in ignored signs, unredeemed coupons, and deleted e-mails. Consumers place no value on the interaction because it has no connection to their current real-world activities.

In preferred embodiments, the service utilizes an interface that achieves the benefits of direct interaction with the mass market appeal of virtual interactions. The service can include the ability to personalize interaction with the consumer to the extent the interface system has information about a particular consumer. This is done by making use of the consumer's mobile phone as both a locator as well as a message transceiver. Using a device or method that can detect and identify a mobile phone within a specific proximity, or a method that allows a consumer to initiate detection, such as is described above (including via radio frequency, manual input, transmission of specialized or general text messages, geo-location services or any other method of acquisition), the device can trigger a system that intelligently interacts with the owner of the phone based on the real-world characteristics of the phone (e.g. location, speed, direction, acceleration, etc.). In this way, a virtual (personalized) interaction (in the sense that the interaction is with a single person) can take place triggered by a consumer's real-world activities, much in the same way direct interactions occur. Once the initial interaction (triggered by a consumer's real-world actions) is initiated on behalf of the retailer, the interaction can then become a conversation where the consumer takes on the role of the inquirer and the system becomes a responder. This can take place over any sort of mobile phone based interactive medium such as text messages, mobile web, or even phone conversation. Depending on the sophistication of the detection device, it could be done via the existing mobile phone network or directly to the phone from the detection device.

The applications of this system are manifold from both the perspective of the retailer as well as the consumer including but not limited to: welcome messages, farewell messages, reminders, promotional games/entertainment, targeted advertisement, event notices, sale notices, receipt access, gift account access, loyalty balance access, payments, offer matching, warrantee access, rebate process, shopping lists, surveys, gift registrations lists, consumer feedback, etc.

Figure 6:
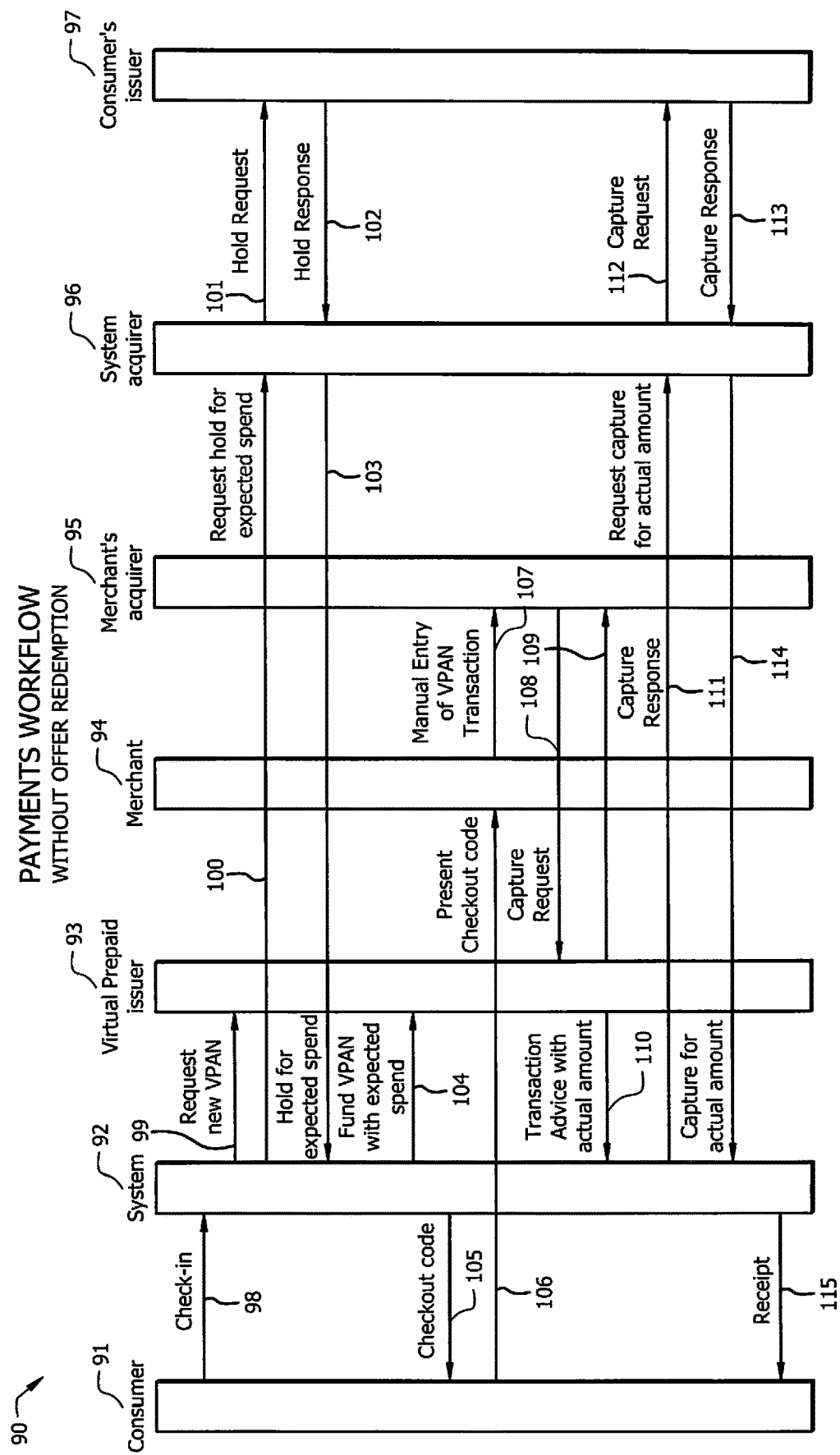
FIG. 6 is a workflow diagram of an embodiment of a workflow implementing the service and method described herein for a transaction without an offer component.

Referring now to FIG. 6, an embodiment of a payment workflow for a system according to the concepts described herein is shown. The embodiment of the workflow 90 shown in FIG. 6 does not include an offer to the consumer. Workflow 90 shows the process and message flow between the different entities utilized by the system. These entities include the consumer 91, the system 92, the virtual prepaid account issuer 93, the merchant, the merchant's acquirer 95, the system's acquirer 96, and the consumer's issuer 97. The merchant's acquirer and the system's acquirer are the institutions used by those entities to process electronic payments. The consumer's issuer is the payment mechanism used by the consumer to fund transactions, such as the consumer's credit card, debit card, bank account, PayPal account or any other payment system that could be used by the consumer to fund their purchases.

Workflow 90 begins with the consumer 91 sending a check in notice 98 to system 92. Once the consumer 91 has checked in, system 92 sends a request 99 for a new VPAN to virtual prepaid account issuer 93. In addition, system 92 sends a hold request 100 for the consumer's expected or predicted spend to its acquirer 96, and acquirer 96 passes that hold request 101 to the consumer's issuer 97. Hold responses 102 and 103 are sent to system acquirer 96 and system 92, respectively, confirming the hold. Once the hold is in place on the consumer's issuer account, system 92 then funds 104 the VPAN at issuer 93 with the expected or predicted spend amount, and the checkout code 105 is sent to the consumer 91.

At check out, consumer 91 presents the checkout code 106 to the merchant 94, and merchant 94 combines the merchant code (the prefix, as described with reference to FIGS. 2b and 2c) with the consumer's checkout code (the suffix) to create the WAN to be used in the transaction. The merchant then enters the VPAN as the payment mechanism for the transaction 107 which is sent to the merchant's acquirer 95. The merchant's acquirer 95 sends a capture request 108 to the virtual prepaid account issuer 93 which sends back a capture response 109 and sends a transaction advice 110 with the actual transaction amount to the system 92.

To complete the transaction, the system 92 sends a capture request 111 to the system acquirer 96 for the actual amount to the transaction and the system acquirer sends a capture request 112 to the consumer issuer 97. A capture response 113 is sent by the consumer issuer 97 to the system acquirer 96, which is passed along 114 to system 92. System 92 can then issue an electronic receipt 115 to the consumer 91 to complete the transaction.

Figure 7:
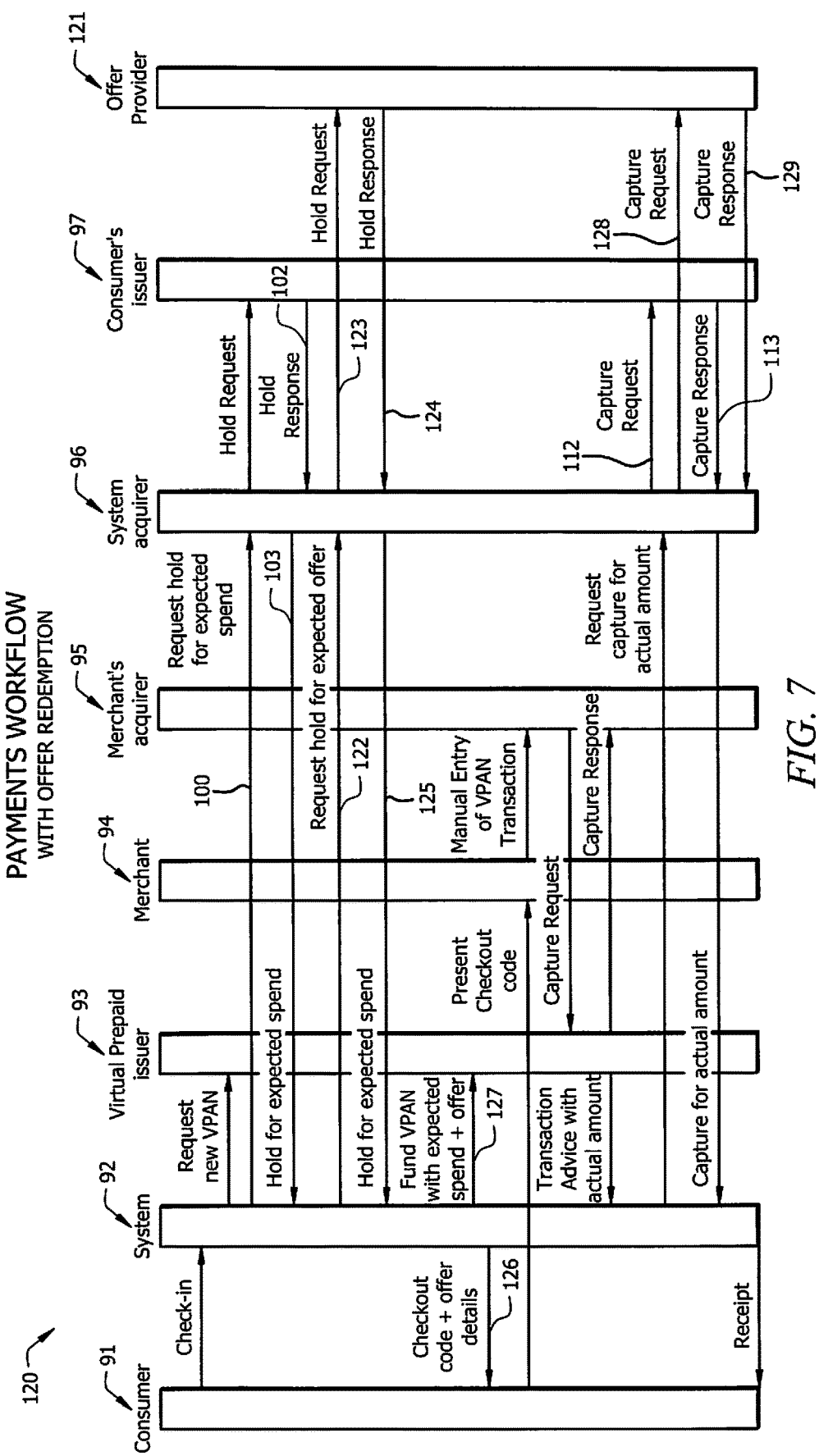
FIG. 7 is a workflow diagram of an embodiment of a workflow implementing the service and method described herein for a transaction with an offer component.

Referring now to FIG. 7, an embodiment of a payment workflow 120 for a system according to the concepts described herein is shown. The embodiment of the workflow 120 shown in FIG. 7 does include an offer to the consumer. The entities are the same as were described with respect to FIG. 6, except that an offer provider 121 is added to the transaction. As has been described, the offer provider may be any third party or may be the merchant 94 or even the system 92.

Workflow proceeds as described with respect to FIG. 6, except that after the hold request 100 from system 92 and the hold responses 102 and 103, system 92 issues an additional hold request 122 and 123 to the offer provider 121 for the amount of the offer. The offer provider 121 then provides the hold responses 124 and 125 for the amount of the offer. Once the original spend hold and the offer hold are in place, system 92 issues the checkout code 126 with the offer details and funds the VPAN 127 with the expected spend plus the offer.

The rest of the workflow is again the same as the non-offer workflow except that an additional capture request 128 to the offer provider 121, with the capture request 112 to the consumer's issuer 97, is sent by the system acquirer 96. The offer provider 121 then sends the capture response 129 for the offer amount alongside the capture response 113 from the consumer's issuer.

Figure 8:
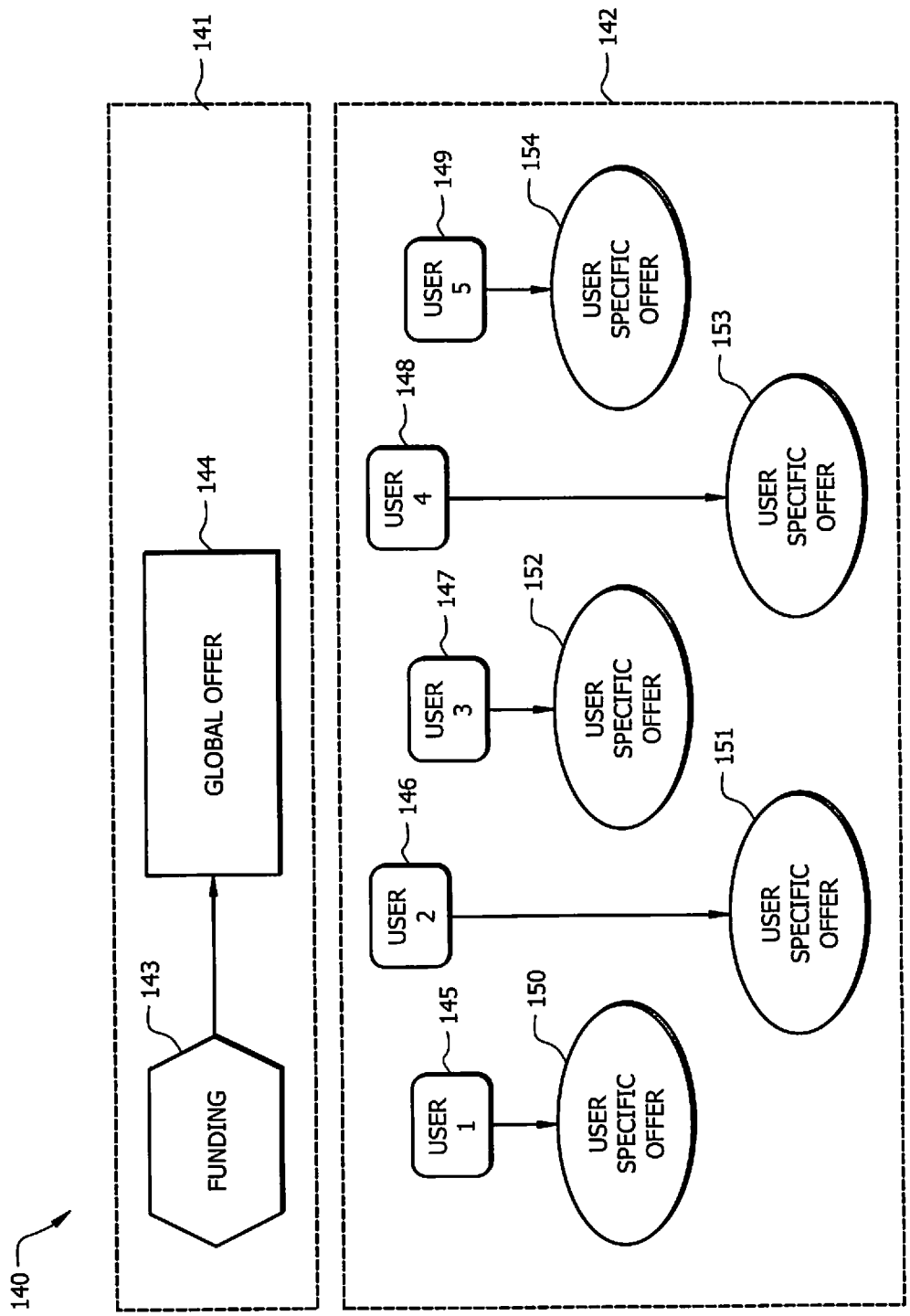
FIG. 8 is a block diagram of an embodiment of an offer engine implementing the offer generation component of the service and method described herein.

Referring now to FIG. 8, an embodiment of an offer engine for use with the system of the present invention is described. In preferred embodiments of an offer engine 140, the offer engine includes both a global offer component 141 and a user specific offer component 142. The global offer component 141 includes one or more funding sources 143. The funding source can be any funding source, including the merchant, a product manufacturer, a service provider, a franchisor, a marketing company, another individual consumer or any other entity desiring to make an offer on a product or service or at a merchant, particular merchant locations, or group of merchants. The funding source supplies a fixed or variable funding pool that can be drawn against as consumers accept and use the offers. This approach results in funding for offers occurring in real time for precisely the amount of the actual redemption at the moment of checkout and is a critical component of this system.

In addition to the funding source 143, the global offer component 141 includes one or more global offers 144. The global offers 144 are abstract, non-specific offers associated with a particular funding source 143. The global offers include information and rules regarding start date, expiration, qualification, award, messages and any other information or rule that can be used to control an offer. The location for the global offers can be determined in the rules and may target any merchant, location, group of merchants, or group of locations. The rules may take into account geographic information, local nuances, local regulation or laws, or other merchant, product, service, or location specific information.

Once the global offer information 144 is in place, the offer engine 141 can then make user specific offers using the user specific offer component 142. Offer engine 140 take the global offer rules 144 and then applies them to the circumstances, demographics, and consumer specific information of each user. Each of the offers may have both qualification rules and award rules. Qualification rules determine whether each user is eligible for an offer under the particular offer rules. Award rules determine the exact offer that is presented to a particular user or consumer. This allows the offer engine to present selected users 145, 146, 147, 148 and 149 with user specific offers 150, 151, 152, 153 and 154 that are specific to their specific circumstances and information.

In a preferred embodiment, the offers themselves may be any type of offer that an offer provider wishes to make to a consumer. The offer may be for a discount on a transaction, product or service, may be a percentage of this particular transaction, may be a percentage of an average spend over a series of transactions, may be a bonus, additional product or any other type of offer. Alternative embodiments permit data as distinct as line item information and ordinality of product selection to determine redemption of the offer.

Figure 9:
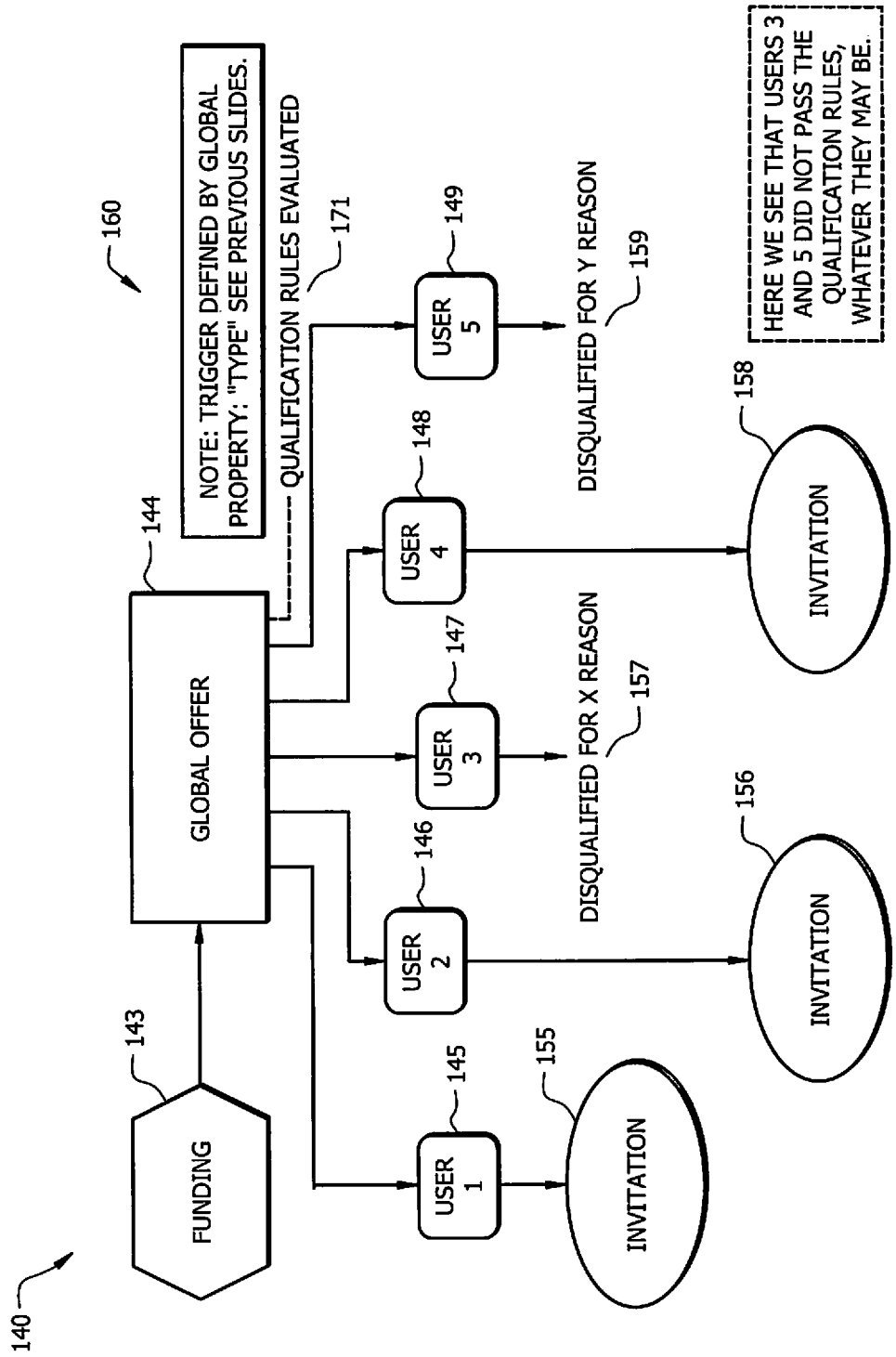
FIG. 9 is a block diagram of an embodiment of an offer sequence using the offer engine of FIG. 8.

Referring now to FIG. 9, an embodiment of an offer sequence is shown. In sequence 160, offer engine 140 is used to provide a specific offer from an offer provider providing a funding pool 143 and a global offer 143. As described, global offer 143 provides global offer rules which can be applied to specific consumers, such as consumers 145-149 through an offer evaluation process 171. The application of the offer rules results in either an invitation, or offer, 155, 156, and 158 being made to an applicable consumer, or results in a consumer being disqualified for a particular reason, such as disqualification for reason "X" 157, or disqualification for reason "Y" 159 where "X" and "Y" are specific disqualifying decisions that a specific consumer fails to pass. The invitations themselves can be the same for all offer recipients or can be different based on the individual user attributes.

Figure 10:
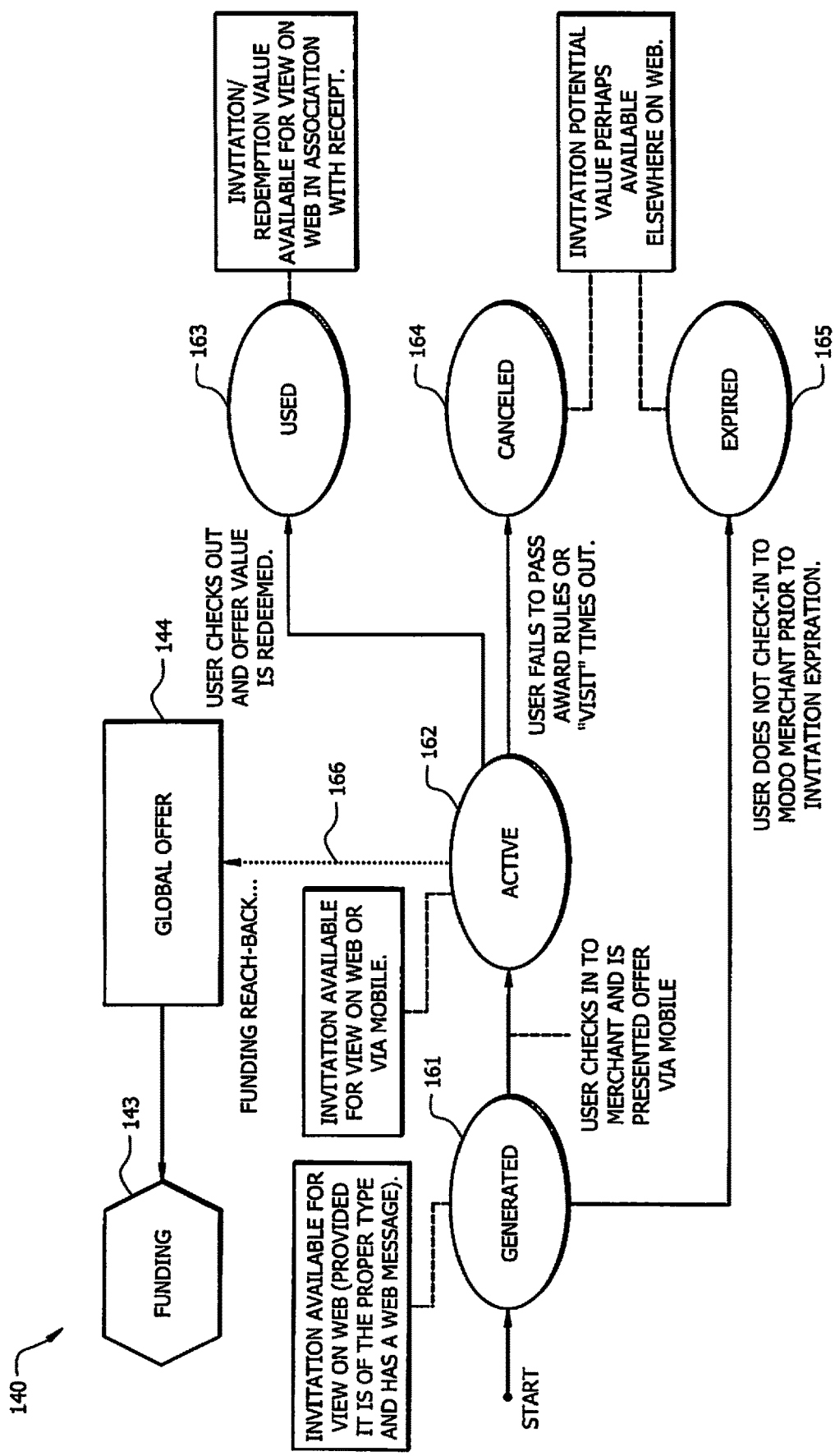
FIG. 10 is a block diagram of an embodiment of an offer lifecycle according to the concepts described herein.

Referring now to FIG. 10, an embodiment of an offer lifecycle is shown. Offer engine 140 again includes funding pool 143 and global offer 144 containing the rules and eligibility requirements. Based on program start dates and requirements of the global offer, generated offers are created and may or may not be made available on the web for consumer to see. Once a consumer checks in at a participating merchant, he or she is presented with an active offer(s) 162 from the generated offers 161. The consumer can see the offer(s) from a message(s) sent to the consumer after he or she has checked in, or he or she may go to a website to view the offer(s) or further offer details.

Once active, an offer 162 can then either be used 163 or can be canceled 164. A used offer 163 is redeemed for value by the consumer according to the concepts described herein and the consumer can see the transaction history, including the offer value in association with their account information or receipt. If the consumer fails to meet the offer requirements or chooses not to make a purchase, the active offer 162 is canceled. Active offers can have preset time limits that allow the offer to be canceled and the funding returned to the funding pool 143 if not used. Offers generated 161, but not used within the offer time frame set out by the global offer requirements 144 are considered expired 165. As with canceled offers, any funds for an expired offer which had been reserved can be returned to the pool. Offers can be processed as batches or can be processed in real time. Information 166 relating to the state of the offers is sent back to the offer engine to allow for critical tracking and accounting to take place to ensure that the offers are being made and redeemed according to the global offer rules 144 and to ensure that the funding pool is not exceeded.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for allowing a consumer to complete a payment transaction with a merchant at a merchant location using a mobile device of the consumer and a point of sale terminal of the merchant, the system comprising:
a remote server in communication with the mobile device, the mobile device associated with the consumer and registered with the system, the mobile device configured to detect a presence of the consumer at the merchant location, the remote server configured to verify an identity of the consumer using the identifying characteristics of the mobile device and to form a virtual payment account number, the virtual payment account number formed by merging a checkout code with a merchant code, wherein the checkout code is selected from a range of available numbers determined by the merchant code assigned to the merchant location, and wherein the checkout code sent to the consumer changes with each visit to the merchant location and is specific to the payment transaction, the remote server further configured to send the checkout code to the consumer using the mobile device after detection of the consumer at the merchant location; and
wherein the point of sale terminal is configured to process the payment transaction at the request of the consumer, and wherein the checkout code is merged with the merchant code, the merchant code provided to the merchant prior to the payment transaction, wherein the merged checkout code and merchant code form the virtual payment account number, and wherein the system processes the payment transaction using the virtual payment account number as a mechanism for payment using the merchant's existing payment processing system.

2. The system of claim 1, wherein the virtual payment account number includes a check value to verify that the virtual payment account number is a valid account number.

3. The system of claim 1, wherein the remote server is further configured to present the consumer an offer redeemable at the merchant using the checkout code.

4. The system of claim 1 wherein the mobile device associated with the consumer is the consumer's mobile phone, the consumer's mobile phone providing a secure identification of a valid user of a particular payment card, based on location, phone number, and phone device.

5. The system of claim 1, wherein the remote server is further configured to prefund the virtual payment account number with funds expected to be sufficient to cover the payment transaction.

6. The system of claim 1, wherein the remote server is further configured to send the consumer a receipt with the details of the payment transaction wherein the checkout code is used with a transaction date and time to identify the payment transaction.

7. The system of claim 1 wherein the remote server is further configured to deduct the transaction amount from a payment mechanism supplied by the consumer.

8. The system of claim 1 wherein the checkout code expires after a predetermined amount of time.

9. The system of claim 1 wherein the virtual payment account number is a sixteen digit number processable using existing credit card payment processing mechanisms.

10. The system of claim 1 wherein the remote server is further configured to verify that the consumer is present at the merchant using geolocation services.

11. A system for completing a payment transaction between a consumer and a merchant using a mobile device of the consumer and a payment processing terminal of the merchant, the system comprising:
a remote server in communication with the mobile device and configured to receive a check-in message from the mobile device when the consumer enters a merchant's location and the remote server configured to verify an identity of the consumer using identifying characteristics of the mobile device and further configured to receive a virtual payment account number from an account issuer, the virtual payment account number comprising a checkout code merged with a merchant code, wherein the checkout code is selected from a range of available numbers determined by the merchant code assigned to the merchant location, and wherein the checkout code sent to the consumer changes with each visit to the merchant and is specific to the payment transaction, the remote server further configured to fund the virtual payment account number with an amount equal to an expected spend by the consumer and to send the checkout code to the consumer after receiving the check-in message, wherein the checkout code is merged with the merchant code to form the virtual payment account number, the merchant code provided to the merchant prior to the payment transaction; and
wherein the payment processing terminal at the merchant is configured to initiate the payment transaction at the request of the consumer;
wherein the payment transaction is processed using the virtual payment account number as a mechanism for payment using the merchant's existing payment processing system;
wherein the remote server is further configured to receive an authorization from the account issuer after the consumer has completed the payment transaction using the virtual payment account number, and to send the consumer a receipt for the payment transaction; and
wherein the remote server is configured to charge a customer account in the amount of the payment transaction.

12. The system of claim 11 wherein the virtual payment account number includes a check value to verify that the virtual payment account number is a valid account number.

13. The system of claim 11 wherein the checkout code is sent to the consumer's mobile phone, the consumer's mobile phone providing a secure identification of a valid user of a particular payment card, based on location, phone number, and phone device.

14. The system of claim 11 wherein the checkout code expires after a predetermined amount of time.

15. The system of claim 11 wherein the virtual payment account number is a sixteen digit number processable using existing credit card payment processing mechanisms.

16. The system of claim 11 wherein the remote server is further configured to charge a consumer payment mechanism for a final amount of the payment transaction.

17. The system of claim 11 wherein the remote server is further configured to verify that the consumer is present at the merchant using geolocation services.

* * * * *